(No Model.)
A. S. NEWBY.
Bottom Grate for Stoves.
No. 235,891.      Patented Dec. 28, 1880.
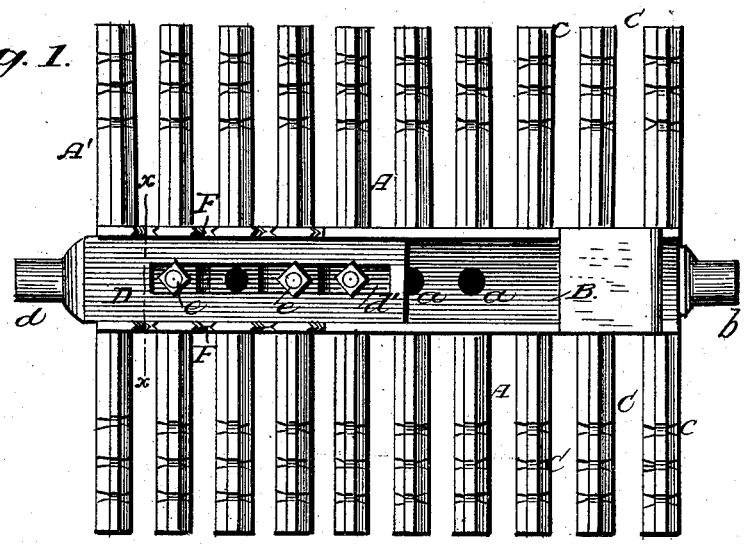
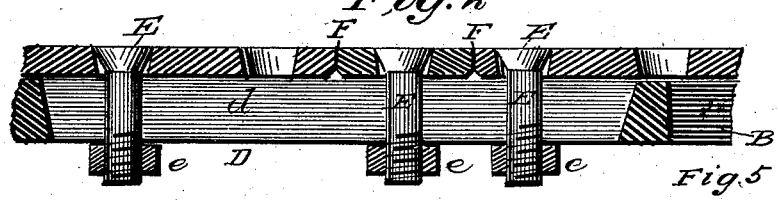
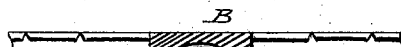
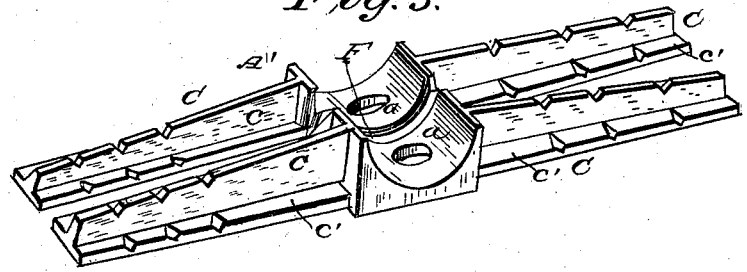
Witnesses
Fred G. Dieterich
Albert H. Krause
Inventor.
Albert S. Newby
by A. C. Jenkins
atty

UNITED STATES PATENT OFFICE.

ALBERT S. NEWBY, OF CHAMPAIGN, ILLINOIS.

BOTTOM GRATE FOR STOVES.

SPECIFICATION forming part of Letters Patent No. 235,891, dated December 28, 1880.

Application filed May 7, 1880. (No model.)

*To all whom it may concern:*

Be it known that I, ALBERT S. NEWBY, a citizen of the United States, residing at Champaign, in the county of Champaign and State of Illinois, have invented certain new and useful Improvements in Bottom Grates for Stoves, Ranges, &c.; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1 is a bottom plan of my improved grate; Fig. 2, a central section of the same; Fig. 3, detail bottom view of two of the grate-bars. Fig. 4 is a transverse section through one of the grate-bars C, shown in Fig. 5. Fig. 5 is a transverse section through the line $x\,x$ of Fig. 1, when reversed to show a top plan of the grate.

My invention relates to certain new and useful improvements in the class of sectional bottom grates which can be readily adapted to different-sized stoves, furnaces, &c.

To this end the invention consists in the novel construction, combination, and arrangement of parts, all as will be hereinafter fully described, and specifically pointed out in the claims.

To enable others skilled in the art to make and use my invention, I will now proceed to describe its construction and operation.

In the drawings, A represents the main section of my improved grate, having a trough-shaped central bar, B, with grate-bars C projecting from each side thereof, and an end journal, $b$.

D represents a longitudinal oval-shaped bar, adapted to fit in the trough-shaped bar B of the main section, and provided with an end journal, $d$.

The bar B of the main section is provided with a series of holes, $a$, and the bar D with a longitudinal central slot, $d'$, by which, through the medium of screw bolts and nuts E $e$, said bars are adapted to be adjustably secured together, for the purpose of lengthening or shortening the grate to suit different-sized stoves, furnaces, &c. Sections A' of grate-bars, similar to section A, are also provided with holes, by which they can be secured in a similar manner, by bolts and nuts E $e''$, to bar D. These sections A A' are provided with transverse grooves F between the bars C, as clearly shown in Figs. 1 and 3, by which the bars can be readily broken off and added to bar D by adjusting said bar outward or away from bar B, in order to lengthen the grate, or taken or broken off, and bar D adjusted toward bar B, to shorten the grate.

The grate-bars C are made T-shaped in cross-section, with main rib $c$ extending downward, and the side flanges, $c'\,c'$, are made thinner, or beveled off on their bottom sides toward the main rib $c$, as shown at $c^2$, Fig. 4, to permit of their being cracked or broken off to increase the ventilating-space between the bars, as a coal or wood fire may require, while the sides $c^3\,c^3$ of the flanges $c'\,c'$ are beveled off downward to prevent clogging and choking up of the grate. Consequently the bars cannot warp or become crooked by heat, as the air has free and close circulation and connection with the fire. The grate-bars C are also provided with cross-grooves, by which they can be readily broken off to suit the width of different-sized stoves, furnaces, &c.

The bolt-holes in the bar B of main section A also act as ventilators for the grate.

In manufacturing my improved grates it is designed to make them of the ordinary size or length, so that the bars C, broken off to make a short grate, may be used to form a long grate.

Further explanation of my improved grate is deemed unnecessary, it being obvious from the foregoing description.

Having thus fully described my invention, what I claim as new, and desire to secure by Letters Patent, is—

1. The combination of the main section A, having trough-shaped central bar, B, with projecting grate-bars, and the oval-shaped bar D, provided with one or more similar grate-sections, A', substantially as and for the purpose shown and described.

2. The combination of the main section A, having trough-shaped central bar, B, provided with holes $a$, and the slotted adjustable oval-shaped bar D, substantially as and for the purpose herein shown and described.

3. The combination, with the adjustable oval-shaped bar D, of the sections A, having trough-shaped central bar, B, provided with transverse grooves F between the grate-bars, substantially as and for the purpose herein shown and described.

4. The combination, with the central bar, B, of the grate-bars C, made T-shaped in cross-section, with main rib $c$ extending downward, and flanges $c'$ $c'$, beveled off on their sides, and also bottom sides toward main rib $c$, substantially as and for the purpose specified.

In testimony whereof I affix my signature in presence of two witnesses.

ALBERT S. NEWBY.

Witnesses:
 HARVEY P. CUMMINGS,
 JOHN WASHBURN.